(12) United States Patent
Lang et al.

(10) Patent No.: US 8,071,660 B2
(45) Date of Patent: Dec. 6, 2011

(54) SURFACE MODIFIED BIOMEDICAL DEVICES

(75) Inventors: Weihong Lang, Amston, CT (US); Yu-Chin Lai, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 396 days.

(21) Appl. No.: 12/329,694

(22) Filed: Dec. 8, 2008

(65) Prior Publication Data

US 2009/0153793 A1   Jun. 18, 2009

Related U.S. Application Data

(60) Provisional application No. 61/013,779, filed on Dec. 14, 2007.

(51) Int. Cl.
*G02C 7/02* (2006.01)
*C08F 14/18* (2006.01)
*A61F 2/16* (2006.01)

(52) U.S. Cl. .......... 523/107; 523/205; 525/326.2; 351/159; 351/160 R; 623/6.62

(58) Field of Classification Search .......... 523/107, 523/205; 525/326.2; 351/159, 160 R; 623/6.62
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,055,378 A | 10/1977 | Feneberg et al. | |
| 4,113,224 A | 9/1978 | Clark et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,197,266 A | 4/1980 | Clark et al. | |
| 4,214,014 A | 7/1980 | Höfer et al. | |
| 4,312,575 A | 1/1982 | Peyman et al. | |
| 4,440,918 A | 4/1984 | Rice et al. | |
| 4,555,732 A | 11/1985 | Tuhro | |
| 4,632,844 A | 12/1986 | Yanagihara et al. | |
| 4,650,843 A | 3/1987 | Yokoyama et al. | |
| 4,740,533 A | 4/1988 | Su et al. | |
| 4,910,277 A | 3/1990 | Bambury et al. | |
| 4,954,587 A | 9/1990 | Mueller | |
| 4,990,582 A | 2/1991 | Salamone | |
| 4,996,275 A | 2/1991 | Ellis et al. | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,162,469 A | 11/1992 | Chen | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Künzler et al. | |
| 5,358,995 A | 10/1994 | Lai et al. | |
| 5,387,662 A | 2/1995 | Künzler et al. | |
| 5,449,729 A | 9/1995 | Lai | |
| 5,512,205 A | 4/1996 | Lai | |
| 5,610,252 A | 3/1997 | Bambury et al. | |
| 5,616,757 A | 4/1997 | Bambury | |
| 5,700,559 A | 12/1997 | Sheu et al. | |
| 5,705,583 A | 1/1998 | Bowers et al. | |
| 5,708,094 A | 1/1998 | Lai et al. | |
| 5,710,302 A | 1/1998 | Künzler et al. | |
| 5,714,557 A | 2/1998 | Künzler et al. | |
| 5,908,906 A | 6/1999 | Künzler et al. | |
| 6,440,571 B1 | 8/2002 | Valint, Jr. et al. | |
| 6,599,559 B1 | 7/2003 | McGee et al. | |
| 6,638,563 B2 | 10/2003 | McGee et al. | |
| 7,083,646 B2 | 8/2006 | Valint, Jr. et al. | |
| 7,084,188 B2 | 8/2006 | Lai et al. | |
| 7,176,268 B2 | 2/2007 | Lai et al. | |
| 2003/0068433 A1 | 4/2003 | McGee et al. | |
| 2005/0124719 A1* | 6/2005 | Lai et al. | 523/106 |
| 2005/0124776 A1* | 6/2005 | Lai et al. | 528/25 |
| 2007/0264503 A1 | 11/2007 | Lai et al. | |

FOREIGN PATENT DOCUMENTS

| | | |
|---|---|---|
| JP | 03 196118 | 8/1991 |
| WO | WO 95/04609 | 2/1995 |
| WO | WO 96/31792 | 10/1996 |

OTHER PUBLICATIONS

Lai, Yu-Chin, "The Role of Bulky Polysiloxanylalkyl Methacryates in Polyurethane-Polysiloxane Hydrogels", *Journal of Applied Polymer Science*, vol. 60, 1193-1199 (1996).

* cited by examiner

*Primary Examiner* — Tae H Yoon
(74) *Attorney, Agent, or Firm* — John E. Thomas

(57) ABSTRACT

A method for making a surface modified biomedical device is disclosed, the method comprising contacting a surface of a biomedical device with a copolymer which is the reaction product of one or more polymerizable polyhydric alcohols and one or more polymerizable fluorine-containing monomers.

25 Claims, No Drawings

SURFACE MODIFIED BIOMEDICAL DEVICES

This application claims the benefit of Provisional Patent Application No. 61/013,779 filed Dec. 14, 2007 which is incorporated by reference herein.

BACKGROUND OF THE INVENTION

1. Technical Field

The present invention generally relates to surface modified biomedical devices, and especially ophthalmic devices that are intended for direct placement on or in the eye such as contact lenses or intraocular lenses and methods for their preparation.

2. Description of Related Art

Medical devices such as ophthalmic lenses made from, for example, silicone-containing materials, have been investigated for a number of years. Such materials can generally be subdivided into two major classes, namely hydrogels and non-hydrogels. Hydrogels can absorb and retain water in an equilibrium state, whereas non-hydrogels do not absorb appreciable amounts of water. Regardless of their water content, both hydrogel and non-hydrogel silicone medical devices tend to have relatively hydrophobic, non-wettable surfaces that have a high affinity for lipids. This problem is of particular concern with contact lenses.

Those skilled in the art have long recognized the need for modifying the surface of such silicone contact lenses so that they are compatible with the eye. It is known that increased hydrophilicity of the lens surface improves the wettability of the contact lens. This, in turn, is associated with improved wear comfort of contact lenses. Additionally, the surface of the lens can affect the lens's susceptibility to deposition, particularly the deposition of proteins and lipids resulting from tear fluid during lens wear. Accumulated deposition can cause eye discomfort or even inflammation. In the case of extended wear lenses (i.e., lenses used without daily removal of the lens before sleep), the surface is especially important, since extended wear lenses must be designed for high standards of comfort and biocompatibility over an extended period of time.

Silicone lenses have been subjected to plasma surface treatment to improve their surface properties, e.g., surfaces have been rendered more hydrophilic, deposit resistant, scratch-resistant, or otherwise modified. Examples of previously disclosed plasma surface treatments include subjecting the surface of a contact lens to a plasma containing an inert gas or oxygen (see, for example, U.S. Pat. Nos. 4,055,378; 4,122,942; and 4,214,014); various hydrocarbon monomers (see, for example, U.S. Pat. No. 4,143,949); and combinations of oxidizing agents and hydrocarbons such as water and ethanol (see, for example, WO 95/04609 and U.S. Pat. No. 4,632,844). U.S. Pat. No. 4,312,575 discloses a process for providing a barrier coating on a silicone or polyurethane lens by subjecting the lens to an electrical glow discharge (plasma) process conducted by first subjecting the lens to a hydrocarbon atmosphere followed by subjecting the lens to oxygen during flow discharge, thereby increasing the hydrophilicity of the lens surface.

Accordingly, it would be desirable to provide improved biomedical devices that exhibit suitable physical properties, e.g., modulus and tear strength, and chemical properties, e.g., oxygen permeability and wettability, for prolonged contact with the body while also being biocompatible.

SUMMARY OF THE INVENTION

In accordance with one embodiment of the present invention, a method for making a surface modified biomedical device is provided, the method comprising (a) providing a biomedical device having a plurality of biomedical device surface functional groups; and (b) attaching a copolymer which is the reaction product of one or more polymerizable polyhydric alcohols and one or more polymerizable fluorine-containing monomers to the surface of the biomedical device through the biomedical device surface functional groups.

In accordance with a second embodiment of the present invention, a biomedical device is provided comprising a bulk material having a plurality of biomedical device surface functional groups and a surface coating, in which the biomedical device is characterized by a copolymer attached to the surface of the biomedical device through the biomedical device surface functional groups, wherein the copolymer is the reaction product of one or more polymerizable polyhydric alcohols and one or more polymerizable fluorine-containing monomers.

In accordance with a third embodiment of the present invention, a method for making a surface modified biomedical device is provided comprising contacting a surface of a biomedical device with a copolymer which is the reaction product of one or more polymerizable polyhydric alcohols and one or more polymerizable fluorine-containing monomers.

The surface modified biomedical devices of the present invention advantageously provide a higher level of performance quality and/or comfort to the users due to their hydrophilic or lubricious (or both) surfaces. Hydrophilic and/or lubricious surfaces of the biomedical devices herein such as contact lenses substantially prevent or limit the adsorption of tear lipids and proteins on, and their eventual absorption into, the lenses, thus preserving the clarity of the contact lenses. This, in turn, preserves their performance quality thereby providing a higher level of comfort to the wearer.

DETAILED DESCRIPTION OF THE PREFERRED EMBODIMENTS

The present invention is directed to surface modified biomedical devices intended for direct contact with body tissue or fluid. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses. The devices can provide optical correction, wound care, drug delivery, diagnostic functionality or cosmetic enhancement or effect or a combination of these properties. As used herein, the term "ophthalmic device" refers to devices that reside in or on the eye. Useful ophthalmic devices include, but are not limited to, ophthalmic lenses such as soft contact lenses, e.g., a soft, hydrogel lens (e.g., silicone hydrogels), soft, non-hydrogel lens and the like; hard contact lenses, e.g., a hard, gas permeable lens material and the like; intraocular lenses; overlay lenses; ocular inserts; optical inserts and the like. As is understood by one skilled in the art, a lens is considered to be "soft" if it can be folded back upon itself without breaking. The preferred biomedical devices are ophthalmic devices, particularly contact lenses, most particularly contact lenses made from silicone hydrogels. The biomedical devices are coated with the coating composition described herein to render a lubricious, stable, highly wettable surface coating on the biomedical device.

The biomedical devices to be surface modified according to the present invention can be any material known in the art capable of forming a biomedical device as described above.

In one embodiment, a biomedical device includes devices formed from material not hydrophilic per se. Such devices are formed from materials known in the art and include, by way of example, polysiloxanes, perfluoropolyethers, fluorinated poly(meth)acrylates or equivalent fluorinated polymers derived, e.g., from other polymerizable carboxylic acids, polyalkyl (meth)acrylates or equivalent alkylester polymers derived from other polymerizable carboxylic acids, or fluorinated polyolefins, such as fluorinated ethylene propylene polymers, or tetrafluoroethylene, preferably in combination with a dioxol, e.g., perfluoro-2,2-dimethyl-1,3-dioxol. Representative examples of suitable bulk materials include, but are not limited to, Lotrafilcon A, Neofocon, Pasifocon, Telefocon, Silafocon, Fluorsilfocon, Paflufocon, Silafocon, Elastofilcon, Fluorofocon or Teflon AF materials, such as Teflon AF 1600 or Teflon AF 2400 which are copolymers of about 63 to about 73 mol % of perfluoro-2,2-dimethyl-1,3-dioxol and about 37 to about 27 mol % of tetrafluoroethylene, or of about 80 to about 90 mol % of perfluoro-2,2-dimethyl-1,3-dioxol and about 20 to about 10 mol % of tetrafluoroethylene.

In another embodiment, a biomedical device includes devices formed from material hydrophilic per se, since reactive groups, e.g., carboxy, carbamoyl, sulfate, sulfonate, phosphate, amine, ammonium or hydroxy groups, are inherently present in the material and therefore also at the surface of a biomedical device manufactured therefrom. Such devices are formed from materials known in the art and include, by way of example, polyhydroxyethyl acrylate, polyhydroxyethyl methacrylate, polyvinyl pyrrolidone (PVP), polyacrylic acid, polymethacrylic acid, polyacrylamide, polydimethylacrylamide (DMA), polyvinyl alcohol and the like and copolymers thereof, e.g., from two or more monomers selected from hydroxyethyl acrylate, hydroxyethyl methacrylate, N-vinyl pyrrolidone, acrylic acid, methacrylic acid, acrylamide, dimethyl acrylamide, vinyl alcohol and the like. Representative examples of suitable bulk materials include, but are not limited to, Polymacon, Tefilcon, Methafilcon, Deltafilcon, Bufilcon, Phemfilcon, Ocufilcon, Focofilcon, Etafilcon, Hefilcon, Vifilcon, Tetrafilcon, Perfilcon, Droxifilcon, Dimefilcon, Isofilcon, Mafilcon, Nelfilcon, Atlafilcon and the like. Examples of other suitable bulk materials include balafilcon A, hilafilcon A, alphafilcon A, bilafilcon B and the like.

In another embodiment, biomedical devices to be surface modified according to the present invention include devices which are formed from material which are amphiphilic segmented copolymers containing at least one hydrophobic segment and at least one hydrophilic segment which are linked through a bond or a bridge member.

It is particularly useful to employ biocompatible materials herein including both soft and rigid materials commonly used for ophthalmic lenses, including contact lenses. In general, non-hydrogel materials are hydrophobic polymeric materials that do not contain water in their equilibrium state. Typical non-hydrogel materials comprise silicone acrylics, such as those formed bulky silicone monomer (e.g., tris(trimethylsiloxy)silylpropyl methacrylate, commonly known as "TRIS" monomer), methacrylate end-capped poly(dimethylsiloxane) prepolymer, or silicones having fluoroalkyl side groups (polysiloxanes are also commonly known as silicone polymers).

On the other hand, hydrogel materials comprise hydrated, cross-linked polymeric systems containing water in an equilibrium state. Hydrogel materials contain about 5 weight percent water or more (up to, for example, about 80 weight percent). The preferred hydrogel materials, include silicone hydrogel materials. In one preferred embodiment, materials include vinyl functionalized polydimethylsiloxanes copolymerized with hydrophilic monomers as well as fluorinated methacrylates and methacrylate functionalized fluorinated polyethylene oxides copolymerized with hydrophilic monomers. Representative examples of suitable materials for use herein include those disclosed in U.S. Pat. Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

In one embodiment, hydrogel materials for biomedical devices, such as contact lenses, can contain a hydrophilic monomer such as one or more unsaturated carboxylic acids, vinyl lactams, amides, polymerizable amines, vinyl carbonates, vinyl carbamates, oxazolone monomers, copolymers thereof and the like and mixtures thereof. Useful amides include acrylamides such as N,N-dimethylacrylamide and N,N-dimethylmethacrylamide. Useful vinyl lactams include cyclic lactams such as N-vinyl-2-pyrrolidone. Examples of other hydrophilic monomers include hydrophilic prepolymers such as poly(alkene glycols) functionalized with polymerizable groups. Examples of useful functionalized poly (alkene glycols) include poly(diethylene glycols) of varying chain length containing monomethacrylate or dimethacrylate end caps. In a preferred embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. In another embodiment, a hydrogel material can contain a siloxane-containing monomer and at least one of the aforementioned hydrophilic monomers and/or prepolymers.

Non-limited examples of hydrophobic monomers are $C_1$-$C_{20}$ alkyl and $C_3$-$C_{20}$ cycloalkyl (meth)acrylates, substituted and unsubstituted aryl (meth)acrylates (wherein the aryl group comprises 6 to 36 carbon atoms), (meth) acrylonitrile, styrene, lower alkyl styrene, lower alky vinyl ethers, and $C_2$-$C_{10}$ perfluroalkyl (meth)acrylates and correspondingly partially fluorinate (meth)acrylates.

A wide variety of materials can be used herein, and silicone hydrogel contact lens materials are particularly preferred. Silicone hydrogels generally have a water content greater than about 5 weight percent and more commonly between about 10 to about 80 weight percent. Such materials are usually prepared by polymerizing a mixture containing at least one silicone-containing monomer and at least one hydrophilic monomer. Typically, either the silicone-containing monomer or the hydrophilic monomer functions as a crosslinking agent (a crosslinker being defined as a monomer having multiple polymerizable functionalities) or a separate crosslinker may be employed. Applicable silicone-containing monomers for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Representative examples of applicable silicon-containing monomers include bulky polysiloxanylalkyl(meth)acrylic monomers. An example of a bulky polysiloxanylalkyl(meth) acrylic monomer is represented by the structure of Formula I:

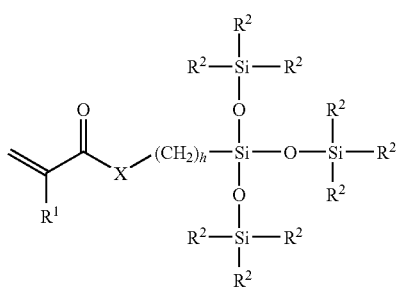

(I)

wherein X denotes —O— or —NR— wherein R denotes hydrogen or a $C_1$-$C_4$ alkyl; each $R^1$ independently denotes hydrogen or methyl; each $R^2$ independently denotes a lower alkyl radical, phenyl radical or a group represented by

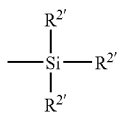

wherein each $R^{2'}$ independently denotes a lower alkyl or phenyl radical; and h is 1 to 10.

Examples of bulky monomers are methacryloxypropyl tris (trimethylsiloxy)silane or tris(trimethylsiloxy)silylpropyl methacrylate, sometimes referred to as TRIS and tris(trimethylsiloxy)silylpropyl vinyl carbamate, sometimes referred to as TRIS-VC and the like.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris (trimethylsiloxy)silyl]propyl vinyl carbamate; 3-[tris (trimethylsiloxy)silyl]propyl allyl carbamate; 3-[tris (trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai Yu-Chin, "The Role of Bulky Polysiloxanyalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae II and III:

$$E(*D*A*D*G)_a*D*A*D*E'; or \qquad (II)$$

$$E(*D*G*D*A)_a*D*A*D*E'; or \qquad (III)$$

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A independently denotes a divalent polymeric radical of Formula IV:

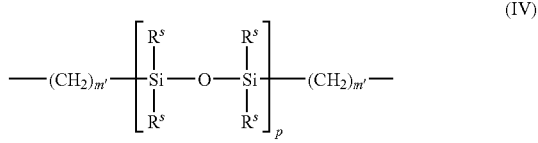

(IV)

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

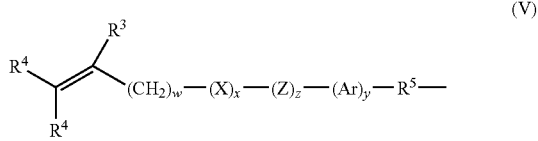

(V)

wherein:

$R^3$ is hydrogen or methyl;

$R^4$ is hydrogen, an alkyl radical having 1 to 6 carbon atoms, or a —CO—Y—$R^6$ radical wherein Y is —O—, —S— or —NH—;

$R^5$ is a divalent alkylene radical having 1 to about 10 carbon atoms;

$R^6$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

A preferred silicone-containing urethane monomer is represented by Formula VI:

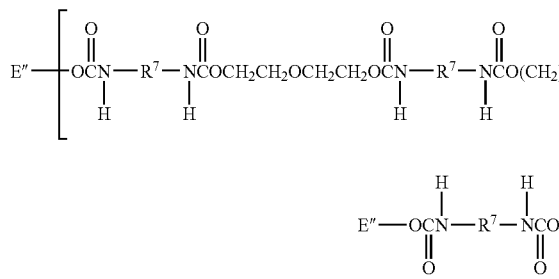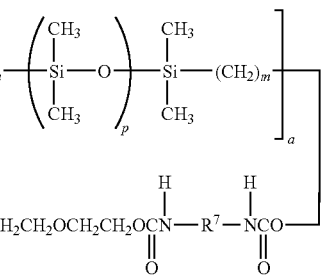

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

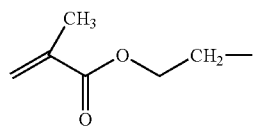

In another embodiment of the present invention, a silicone hydrogel material comprises (in bulk, that is, in the monomer mixture that is copolymerized) about 5 to about 50 percent, and preferably about 10 to about 25, by weight of one or more silicone macromonomers, about 5 to about 75 percent, and preferably about 30 to about 60 percent, by weight of one or more polysiloxanylalkyl (meth)acrylic monomers, and about 10 to about 50 percent, and preferably about 20 to about 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 discloses additional unsaturated groups, including acryloxy or methacryloxy. Fumarate-containing materials such as those disclosed in U.S. Pat. Nos. 5,310,779; 5,449,729 and 5,512,205 are also useful substrates in accordance with the invention. The silane macromonomer may be a silicon-containing vinyl carbonate or vinyl carbamate or a polyurethane-polysiloxane having one or more hard-soft-hard blocks and end-capped with a hydrophilic monomer.

Another class of representative silicone-containing monomers includes fluorinated monomers. Such monomers have been used in the formation of fluorosilicone hydrogels to reduce the accumulation of deposits on contact lenses made therefrom, as disclosed in, for example, U.S. Pat. Nos. 4,954, 587; 5,010,141 and 5,079,319. Also, the use of silicone-containing monomers having certain fluorinated side groups, i.e., —$(CF_2)$—H, have been found to improve compatibility between the hydrophilic and silicone-containing monomeric units. See, e.g., U.S. Pat. Nos. 5,321,108 and 5,387,662.

The above silicone materials are merely exemplary, and other materials for use as substrates that can benefit by being coated with the hydrophilic coating composition according to the present invention and have been disclosed in various publications and are being continuously developed for use in contact lenses and other medical devices can also be used. For example, a biomedical device can be formed from at least a cationic monomer such as cationic silicone-containing monomer or cationic fluorinated silicone-containing monomers.

Contact lenses for application of the present invention can be manufactured employing various conventional techniques, to yield a shaped article having the desired posterior and anterior lens surfaces. Spincasting methods are disclosed in U.S. Pat. Nos. 3,408,429 and 3,660,545; and static casting methods are disclosed in U.S. Pat. Nos. 4,113,224, 4,197,266 and 5,271,876. Curing of the monomeric mixture may be followed by a machining operation in order to provide a contact lens having a desired final configuration. As an example, U.S. Pat. No. 4,555,732 discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge-finishing operations.

Typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product is of particular importance for silicone hydrogels, primarily due to the inclusion of silicone-containing monomers which may tend to separate from the hydrophilic comonomer.

Suitable organic diluents include, for example, monohydric alcohols such as $C_6$-$C_{10}$ straight-chained aliphatic monohydric alcohols, e.g., n-hexanol and n-nonanol; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure.

Generally, the diluent may be included at about 5 to about 60 percent by weight of the monomeric mixture, with about 10 to about 50 percent by weight being especially preferred. If necessary, the cured lens may be subjected to solvent removal, which can be accomplished by evaporation at or near ambient pressure or under vacuum. An elevated temperature can be employed to shorten the time necessary to evaporate the diluent.

Following removal of the organic diluent, the lens can then be subjected to mold release and optional machining operations. The machining step includes, for example, buffing or polishing a lens edge and/or surface. Generally, such machining processes may be performed before or after the article is released from a mold part. As an example, the lens may be dry released from the mold by employing vacuum tweezers to lift the lens from the mold.

As one skilled in the art will readily appreciate, biomedical device surface functional groups of the biomedical device according to the present invention may be inherently present at the surface of the device. However, if the biomedical device contains too few or no functional groups, the surface of the device can be modified by known techniques, for example, plasma chemical methods (see, for example, WO 94/06485), or conventional functionalization with groups such as —OH, —NH$_2$ or —CO$_2$H. Suitable biomedical device surface functional groups of the biomedical device include a wide variety of groups well known to the skilled artisan. Representative examples of such functional groups include, but are not limited to, hydroxy groups, amino groups, carboxy groups, carbonyl groups, aldehyde groups, sulfonic acid groups, sulfonyl chloride groups, isocyanato groups, carboxy anhydride groups, lactone groups, azlactone groups, epoxy groups and groups being replaceable by amino or hydroxy groups, such as halo groups, or mixtures thereof. In one embodiment, the biomedical device surface functional groups of the biomedical device are amino groups and/or hydroxy groups.

The foregoing biomedical devices can be surface modified by attaching a copolymer which is the reaction product of one or more polymerizable polyhydric alcohols and one or more polymerizable fluorine-containing monomers to the biomedical device surface functional groups of the biomedical device. The copolymers for attaching to the biomedical device surface functional groups of the biomedical device are the reaction product of one or more polymerizable polyhydric alcohols and one or more polymerizable fluorine-containing monomers; and (b) a biomedical device-forming comonomer. Suitable polymerizable polyhydric alcohols include polyhydric alcohols having one or more polymerizable ethylenically unsaturated-containing radicals attached thereto. Representative examples of a "polymerizable ethylenically unsaturated-containing radical" include, by way of example, (meth)acrylate-containing radicals, (meth)acrylamide-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like. In one embodiment, a polymerizable ethylenically unsaturated radical can be represented by the general formula:

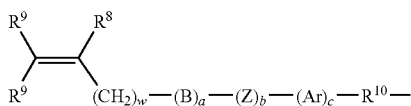

wherein $R^8$ is hydrogen or a alkyl group having 1 to 6 carbon atoms such as methyl; each $R^9$ is independently hydrogen, an alkyl radical having 1 to 6 carbon atoms, or a —CO—Y—$R^{11}$ radical wherein Y is —O—, —S— or —NH— and $R^{11}$ is an alkyl radical having 1 to about 10 carbon atoms; $R^{10}$ is a linking group (e.g., a divalent alkenyl radical having 1 to about 12 carbon atoms); B denotes —O— or —NH—; Z denotes —CO—, —OCO— or —COO—; Ar denotes an aromatic radical having 6 to about 30 carbon atoms; w is 0 to 6; a is 0 or 1; b is 0 or 1; and c is 0 or 1. As used herein, the term "(meth)" denotes an optional methyl substituent. Thus, for example, terms such as "(meth)acrylate" denote either methacrylate or acrylate, and "(meth)acrylamide" denotes either methacrylamide or acrylamide. The ethylenically unsaturated-containing radicals can be attached to the polyhydric alcohols as pendent groups, terminal groups or both.

Representative examples of suitable polymerizable polyhydric alcohols include polyhydroxyl (alk)acrylates having, for example, 2 to 10 hydroxyl groups and preferably 2 to 6 hydroxyl groups and an alkyl group containing from 3 to 12 carbon atoms, polyhydroxyl (alk)acrylamides having, for example, 2 to 10 hydroxyl groups and preferably 2 to 6 hydroxyl groups and an alkyl group containing from 3 to 12 carbon atoms and the like. Useful polyhydroxyl (alk)acrylates include, but are not limited to, glycerol-containing-acrylates -methacrylates, and -ethacrylates, sorbitol-containing-acrylates, -methacrylates and -ethacrylates, erythritol-containing-acrylates, -methacrylates, and -ethacrylates, xylitol-containing-acrylates, -methacrylates, -ethacrylates, derivatives thereof and the like and mixtures thereof. Useful polyhydroxyl alk)acrylamides include, but are not limited to, glycerol-containing-acrylamides, -methacrylamides and -ethacrylamides, sorbitol-containing-acrylamides, -methacrylamides and -ethacrylamides, erythritol-containing-acrylamides, -methacrylamides and -ethacrylamides, xylitol-containing-acrylamides, -methacrylamides and -ethacrylamides, derivatives thereof and the like and mixtures thereof.

Suitable fluorine-containing monomers include fluorine-containing monomers having one or more polymerizable ethylenically unsaturated-containing radicals attached thereto. Representative examples of a "polymerizable ethylenically unsaturated-containing radical" include, by way of example, (meth)acrylate-containing radicals, (meth)acrylamide-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like and as exemplified for the polyhydric alcohol discussed above. The ethylenically unsaturated-containing radicals can be attached to the fluorine-containing monomer as pendent groups, terminal groups or both. In one embodiment, useful polymerizable fluorine-containing monomers include fluorine substituted hydrocarbons having one or more polymerizable ethylenically unsaturated-containing radicals attached thereto and optionally containing one or more ether linkages, e.g., fluorine substituted straight or branched $C_1$-$C_{18}$ alkyl groups having one or more polymerizable ethylenically unsaturated-containing radicals attached thereto which may include ether linkages therebetween; fluorine substituted $C_3$-$C_{24}$ cycloalkyl groups having one or more polymerizable ethylenically unsaturated-containing radicals attached thereto which may include ether linkages therebetween and fluorine substituted $C_6$-$C_{30}$ aryl groups having one or more polymerizable ethylenically unsaturated-containing radicals attached thereto which may include ether linkages therebetween.

Representative examples of alkyl groups for use herein include, by way of example, a straight or branched hydrocarbon chain radical containing carbon and hydrogen atoms of from 1 to about 30 carbon atoms with or without unsaturation, to the rest of the molecule, e.g., methyl, ethyl, n-propyl, 1-methylethyl (isopropyl), n-butyl, n-pentyl, etc., and the like.

Representative examples of cycloalkyl groups for use herein include, by way of example, a substituted or unsubstituted non-aromatic mono or multicyclic ring system of about 3 to about 24 carbon atoms such as, for example, cyclopropyl, cyclobutyl, cyclopentyl, cyclohexyl, perhydronapththyl, adamantyl and norbornyl groups bridged cyclic group or spriro-bicyclic groups, e.g., sprio-(4,4)-non-2-yl and the like, optionally containing one or more heteroatoms, e.g., O and N, and the like.

Representative examples of aryl groups for use herein include, by way of example, a substituted or unsubstituted monoaromatic or polyaromatic radical containing from about 5 to about 30 carbon atoms such as, for example, phenyl, naphthyl, tetrahydronapthyl, indenyl, biphenyl and the like, optionally containing one or more heteroatoms, e.g., O and N, and the like.

Examples of such polymerizable fluorine-containing monomer include, but are not limited to, 2,2,2-trifluoroethyl (meth)acrylate, 2,2,3,3-tetrafluoropropyl (meth)acrylate, 2,2,3,3,3,-pentafluoropropyl (meth)acrylate, 1-trifluoromethyl-2,2,2-trifluoroethyl (meth)acrylate, 1H,1H,5H-octafluoropentyl (meth)acrylate, hexafluoroisopropyl (meth)acrylate, 2,2,3,3,4,4-hexafluorobutyl (meth)acrylate, pentafluorophenyl (meth)acrylate, pentafluorohexyl (meth)acrylate and mixtures thereof.

The copolymers disclosed herein can be obtained by copolymerizing the mixture containing at least one or more polymerizable polyhydric alcohols and one or more polymerizable fluorine-containing monomers by conventional techniques for polymerization, typically thermal or photochemical polymerization. For thermal polymerization, microwave radiation may be used. The temperature employed during thermal polymerization can range from about 40° C. to about 120° C., and typically about 50° C. to about 100° C. is used. For photochemical polymerization, radiation such as gamma, ultraviolet (UV) or visible, may be used.

Polymerization is generally performed in a reaction medium such as, for example, a solution or dispersion using a solvent, e.g., water, an alkanol containing from 1 to 12 carbon atoms such as methanol, ethanol, isopropanol, propan-2-ol, t-butanol, t-amyl alcohol, n-hexanol, nonanol and the like, cyclic ethers such as tetrahydrofuran and the like, aromatic hydrocarbons such as toluene and the like. Alternatively, a mixture of any of the above solvents may be used.

A polymerization initiator may be included in the mixture to facilitate the polymerization step. Representative free radical thermal polymerization initiators are usually peroxides or azo initiators such as, for example, acetal peroxide, lauroyl peroxide, decanoyl peroxide, stearoyl peroxide, benzoyl peroxide, tertiarylbutyl peroxypivalate, peroxydicarbonate, 2,2'-azo-bis(2-methylpropionitrile), benzoin methyl ether and the like and mixtures thereof. Representative UV initiators are those known in the field such as, for example, benzoin methyl ether, benzoin ethyl ether, Darocure 1173, 1164, 2273, 1116, 2959, 3331 (EM Industries) and Igracure 651 and 184 (Ciba-Geigy), and the like and mixtures thereof. Other polymerization initiators which may be used are disclosed in, for example, "Polymer Handbook", 4th edition, Ed. J. Brandrup, E. H. Immergut, E. A. Grulke, A. Abe and D. R. Bloch, Pub. Wiley-Interscience, New York, 1998. Generally, the initiator will be employed in the mixture at a concentration at about 0.1 to about 5 percent by weight of the total mixture.

Generally, polymerization can be carried out for about 1 to about 72 hours and under an inert atmosphere of, for example, nitrogen or argon. If desired, the resulting polymer can be dried under vacuum, e.g., for about 5 to about 72 hours or left in an aqueous solution prior to use. The resulting polymerization product can have a number average molecular weight from about 500 to about 500,000 and preferably from about 1000 to about 200,000.

The precise proportion and nature of the various comonomers used in the mixture to prepare a copolymer disclosed herein may be adjusted to provide a copolymer which is particularly suitable for treating the surface of the device according to the present invention. The mixture which is subjected to polymerization to provide a polymerization product according to the invention can contain a minimum of about 10%, and preferably about 30% to about 80% by weight of one or more polymerizable polyhydric alcohols and a maximum of about 50%, and preferably about 10% to about 30% by weight of one or more polymerizable fluorine-containing monomers.

If desired, the copolymer can be endcapped with a suitable endcapping group as known in the art. Examples of a suitable end-capping group include isocyanatoethyl methacrylate ("IEM"), methacrylic anhydride, methacryloyl chloride, vinylbenzoyl chloride, and the like, to produce a copolymer having one or more terminal polymerizable olefinic groups bonded to the copolymer through linking moieties such as carbamate or ester groups.

The copolymer can be attached to the biomedical device surface functional groups of the biomedical device by techniques known in the art, for example, immersion, dip coating, spray coating, electrostatic coating and the like. For example, in one embodiment, the biomedical device can be contacted with a solution containing the copolymer for a time period sufficient for the reactive groups of the copolymer to covalently bond to the biomedical device surface functional groups of the biomedical device at about room temperature or under autoclave conditions. The coating solution can be an aqueous solution. Alternatively, the coating solution can contain an organic solvent, such as tetrahydrofuran, methanol, ethanol and the like and mixtures thereof.

The coating copolymer can be retained on the surface of the biomedical device through an interaction of the copolymer and biomedical-device surface functional groups. For example, the copolymer may have chemical binding interactions between the biomedical-device surface functional groups and the coating copolymer. Generally, the chemical binding interactions include, but are not limited to, ionic chemical interactions, covalent interactions, hydrogen-bond interactions, hydrophobic interactions, and hydrophilic interactions. Hydrogen-bonding interactions may involve hydrogen-bond donating groups or hydrogen bond accepting groups located on the surface of a biomedical device or as a chemical functional group moiety attached to the copolymer material. Alternatively, such an interaction can involve complexation between the coating copolymer and the biomedical-device surface functional groups. For example, the biomedical device surface functional groups of the biomedical device such as an anhydride, lactone, carboxylic acid, acid chloride and/or epoxide, can react with, for example, alcohol groups of the polyhydric alcohol-fluorine copolymer. Alternatively, in the case of a copolymer endcapped with an ethylenically unsaturated containing radical, by entrapping the endcapped copolymer into the biomedical device, the endcapped copolymer can polymerize itself or react with the biomedical device surface functional groups and can form an interpenetrating polymer network with the biomedical device thereby providing the same benefits for the biomedical device.

In one embodiment, polymerization of the copolymer on the material surface can be initiated by free radical polymerization by exposing the biomedical device to heat and/or radiation, e.g., ultraviolet light (UV), visible light, or high energy radiation, to produce a surface modified biomedical device according to conventional methods. A polymerization initiator may be included in the solution containing the hydrophilic reactive monomer to facilitate the polymerization step. Representative free radical thermal polymerization initiators and UV initiators are those known in the field and as discussed above. Generally, the initiator will be employed in the mixture at a concentration at about 0.1 to about 5 percent by weight of the total mixture.

In the case of thermal initiated polymerization of the reactive groups of the copolymer(s) to the biomedical device surface functional groups of the biomedical device, polymerization can be carried out at an elevated temperature, e.g., at a temperature of from about 35° C. to about 150° C. and preferably about 40° C. to about 125° C., for a time period of, for example, from about 10 minutes to about 48 hours in the absence or presence of a solvent. Alternatively polymerization can be carried out in buffered saline under autoclaving conditions. The reaction is advantageously conducted in a subsurface gas purge such as nitrogen.

In the case of irradiation, polymerization of the reactive groups of the copolymer(s) to the biomedical device surface functional groups of the biomedical device can be carried in one or more steps. The time period for polymerization can vary widely, e.g., in the range of up to about 30 minutes. It is advantageous to carry out the irradiation in a subsurface gas purge such as nitrogen.

In one embodiment, a method of the present invention includes: (1) molding an ophthalmic lens in a mold comprising a posterior and anterior mold portion, (2) removing the lens from the mold, and (3) introducing the lens and the solution with the copolymer into a container.

The surface modified contact lenses obtained herein may be subjected to optional machining operations. Examples of optional machining steps include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

As one skilled in the art will readily appreciate, other steps may be included in the method described above. Such other steps can include, for example, coating the formed lens, further surface treatment of the surface modified lens, inspecting the lens, discarding defective lenses and the like and combinations thereof.

The following examples are provided to enable one skilled in the art to practice the invention and are merely illustrative of the invention. The examples should not be read as limiting the scope of the invention as defined in the claims.

ID2S4H: A methacrylate-capped prepolymer derived from isophorone diisocyanate, diethylene glycol and α,ω-bis-hydroxybutyl polydimethylsiloxane of Mn 4000 at a molar ratio of 6:3:2 and end-capped with 2-hydroxyethyl methacrylate.

TRIS: tris(trimethylsiloxy)silylpropyl methacrylate
NVP: N-vinyl-2-pyrrolidone
DMA: N,N-dimethyl acrylamide
HEMA: 2-hydroxyethyl methacrylate
HEMAVC: methacryloxyethyl vinyl carbonate
D1173: 2-hydroxy-2-methyl-1-phenylpropan-1-one (available as Darocur 1173 initiator)
IMVT: 1,4-bis(4-(2-methacryloxyethyl)phenylamino)anthraquinone
PP: polypropylene
THF: tetrahydrofuran.
DBTDL: dibutyltin dilaurate
IPA: isopropyl alcohol Example 1

Synthesis of Poly(glyceryl methacrylate-co-octafluoropentyl methacrylate) ("P(GM-co-OFPMA)").

To a three-neck 500 l flask equipped with condenser and nitrogen inlet tube was added glyceryl methacrylate (9.724 g; 60.711 mmol), THF (200 ml), 1H,1H, 5H-octafluoropentyl methacrylate (4.481 g; 14.927 mmol), and AIBN (0.214 g; 1.303 mmol). The contents were bubbled vigorously with nitrogen for 20 minutes and then heated to reflux under the constant nitrogen flow overnight. A white product precipitated on the second day. The product was recovered by removal of solvent.

Example 2

Preparation of Lens.
Monomer mixtures are made by mixing the following components listed in Table 1, at amounts per weight.

TABLE 1

| Ingredient | Amount in weight |
|---|---|
| ID2S4H | 11 |
| TRIS | 35 |
| DMA | 10 |
| NVP | 40 |
| HEMAVC | 1 |
| 3-methoxy-1-butanol | 4 |
| Vazo-64 | 0.5 |
| Glycidyl methacrylate | 5 |
| IMVT | 150 ppm |

The resultant monomer mixtures are cast into contact lenses by introducing the monomer mixture to a mold assembly composed of a PP mold for the anterior surface and a PP mold for the posterior surface and thermally curing the monomer mixture at 100° C. for 2 hours. The contact lenses are released from the molds. Next, the lenses are placed in glass vials filled with a 1% solution of the copolymer of Example 1 in THF, and heated at 60° C. for 1 hour. The treated lenses are extracted with IPA overnight, rinsed with deionized water and autoclaved in a borate buffered saline to provide treated hydrogel lenses.

Example 3

Preparation of isocyanatoethyl methacrylate functionalized Poly(glyceryl methacrylate-co-octafluoropentyl methacrylate).

To a three-neck 100 ml flask equipped with condenser, and nitrogen inlet tube, was added glyceryl methacrylate (2.746 g; 17.146 mmol), methanol (50 ml), 1H, 1H,5H-octafluoropentyl methacrylate (1.261 g; 4.199 mmol), and AIBN (0.068 g; 0.414 mmol). The contents were bubbled with nitrogen vigorously for 20 minutes. Next, the mixture was heated under reflux with constant nitrogen flow for two days. The solvent was then removed first under reduced pressure and then under high vacuum for 3 hours to provide a white polymer solid. Anhydrous THF (50 ml) was transferred to the flask containing the white polymer solid under the flowing of dry nitrogen and then DBTDL (0.04 g) and isocyanatoethyl methacrylate ((0.6585 g; (4.244 mmol)) were added to the flask. The contents were then stirred at room temperature for two days under nitrogen purging. The solution was then dialyzed in 2500 ml 50/50 IPA/water solution using a cellulose ester dialysis film with a cut off number average molecular weight of 500 for 6 days. The macro monomer product was recovered by removing the solvent.

Example 4

Preparation of Lens.
Monomer mixtures are made by mixing the following components listed in Table 2, at amounts per weight.

TABLE 2

| Ingredient | Amount in weight |
|---|---|
| ID2S4H | 11 |
| TRIS | 35 |
| DMA | 10 |
| NVP | 40 |
| HEMAVC | 1 |
| 3-methoxy-1-butanol | 4 |
| Vazo-64 | 0.5 |
| Glycidyl methacrylate | 5 |
| IMVT | 150 ppm |

The resultant monomer mixtures are cast into contact lenses by introducing the monomer mixture to a mold assembly composed of a PP mold for the anterior surface and a PP mold for the posterior surface and thermally curing the monomer mixture at 100° C. for 2 hours. The contact lenses are released from the molds. Next, the lenses are placed in glass vials filled with a 1% solution of the endcapped copolymer of Example 3 in THF, and heated at 60° C. for 1 hour. The treated lenses are extracted with IPA overnight, rinsed with deionized water and autoclaved in a borate buffered saline to provide treated hydrogel lenses.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method for making a surface modified biomedical device, the method comprising (a) providing a biomedical device having a plurality of biomedical device surface functional groups; and (b) attaching a copolymer which is the reaction product of one or more polymerizable polyhydric alcohols and one or more polymerizable fluorine-containing monomers to the surface of the biomedical device through the biomedical device surface functional groups.

2. The method of claim 1, wherein the biomedical device surface functional group of the biomedical device is selected from the group consisting of a hydroxy group, amino group, carboxy group, carbonyl group, aldehyde group, sulfonic acid group, sulfonyl chloride group, isocyanato group, carboxy anhydride group, lactone group, azlactone group, epoxy group and mixtures thereof.

3. The method of claim 1, wherein the polymerizable polyhydric alcohol is a polyhydric alcohol terminated with a polymerizable ethylenically unsaturated radical and the polymerizable fluorine-containing monomer is a fluorine-containing monomer terminated with a polymerizable ethylenically unsaturated radical.

4. The method of claim 1, wherein the polymerizable polyhydric alcohol is selected from the group consisting of a polymerizable glycerol-containing compound, polymerizable erythritol-containing compound, polymerizable xylitol-containing compound, polymerizable sorbitol-containing compound and mixtures thereof.

5. The method of claim 1, wherein the polymerizable polyhydric alcohol is selected from the group consisting of glycerol (meth)acrylate, erythritol (meth)acrylate, xylitol (meth)acrylate, sorbitol (meth)acrylate and mixtures thereof.

6. The method of claim 1, wherein the polymerizable fluorine-containing monomer is a fluorinated (meth)acrylate monomer.

7. The method of claim 1, wherein the polymerizable fluorine-containing monomer is selected from the group consisting of 2,2,2-trifluoroethyl (meth)acrylate, 2,2,3,3-tetrafluoropropyl (meth)acrylate, 2,2,3,3,3,-pentafluoropropyl (meth)acrylate, 1-trifluoromethyl-2,2,2-trifluoroethyl (meth)acrylate, 1H,1H,5H-octafluoropentyl (meth)acrylate, hexafluoroisopropyl (meth)acrylate, 2,2,3,3,4,4-hexafluorobutyl (meth)acrylate and mixtures thereof.

8. The method of claim 1, wherein the copolymer is terminated with an ethylenically unsaturated-containing radical.

9. The method of claim 1, wherein step (b) comprises contacting the surface of the biomedical device with the copolymer under free radical polymerization conditions.

10. The method of claim 1, wherein the biomedical device is an ophthalmic lens.

11. The method of claim 10, wherein the ophthalmic lens is a contact lens or an intraocular lens.

12. The method of claim 1, wherein the biomedical device is a silicone hydrogel.

13. A biomedical device comprising a bulk material having a plurality of biomedical device surface functional groups and a surface coating, in which the biomedical device is characterized by a copolymer attached to the surface of the biomedical device through the biomedical device surface functional groups, wherein the copolymer is the reaction product of one or more polymerizable polyhydric alcohols and one or more polymerizable fluorine-containing monomers.

14. The biomedical device of claim 13, wherein the biomedical device surface functional group of the biomedical device is selected from the group consisting of a hydroxy group, amino group, carboxy group, carbonyl group, aldehyde group, sulfonic acid group, sulfonyl chloride group, isocyanato group, carboxy anhydride group, lactone group, azlactone group, epoxy group and mixtures thereof.

15. The biomedical device of claim 13, wherein the polymerizable polyhydric alcohol is a polyhydric alcohol terminated with a polymerizable ethylenically unsaturated radical and the polymerizable fluorine-containing monomer is a fluorine-containing monomer terminated with a polymerizable ethylenically unsaturated radical.

16. The biomedical device of claim 13, wherein the polymerizable polyhydric alcohol is selected from the group consisting of glycerol (meth)acrylate, erythritol (meth)acrylate, xylitol (meth)acrylate, sorbitol (meth)acrylate and mixtures thereof and the polymerizable fluorine-containing monomer is a fluorinated (meth)acrylate monomer.

17. The biomedical device of claim 13, wherein the polymerizable fluorine-containing monomer is selected from the group consisting of 2,2,2-trifluoroethyl (meth)acrylate, 2,2,3,3-tetrafluoropropyl (meth)acrylate, 2,2,3,3,3,-pentafluoropropyl (meth)acrylate, 1-trifluoromethyl-2,2,2-trifluoroethyl (meth)acrylate, 1H,1H,5H-octafluoropentyl (meth)acrylate, hexafluoroisopropyl (meth)acrylate, 2,2,3,3,4,4-hexafluorobutyl (meth)acrylate and mixtures thereof.

18. The biomedical device of claim 13, wherein the copolymer is terminated with an ethylenically unsaturated-containing radical.

19. The biomedical device of claim 13, wherein the biomedical device is an ophthalmic lens.

20. The biomedical device of claim 19, wherein the ophthalmic lens is a contact lens or an intraocular lens.

21. The biomedical device of claim 13, wherein the biomedical device is a silicone hydrogel.

22. A method for making a surface modified biomedical device, the method comprising contacting a surface of a biomedical device with a copolymer which is the reaction product of one or more polymerizable polyhydric alcohols and one or more polymerizable fluorine-containing monomers.

23. The method of claim 22, wherein the polymerizable polyhydric alcohol is selected from the group consisting of glycerol (meth)acrylate, erythritol (meth)acrylate, xylitol (meth)acrylate, sorbitol (meth)acrylate and mixtures thereof and the polymerizable fluorine-containing monomer is a fluorinated (meth)acrylate monomer.

24. The method of claim 22, wherein the copolymer is terminated with an ethylenically unsaturated-containing radical.

25. The method of claim 22, wherein the biomedical device is an ophthalmic lens.

* * * * *